US010621150B2

(12) United States Patent
Callan et al.

(10) Patent No.: US 10,621,150 B2
(45) Date of Patent: Apr. 14, 2020

(54) SYSTEM AND METHOD FOR ENFORCING THE STRUCTURE AND CONTENT OF DATABASES SYNCHRONIZED OVER A DISTRIBUTED LEDGER

(71) Applicants: Jonathan Sean Callan, Cambridge (GB); Keir Finlow-Bates, Kangasala (FI)

(72) Inventors: Jonathan Sean Callan, Cambridge (GB); Keir Finlow-Bates, Kangasala (FI)

(*) Notice: Subject to any disclaimer, the term of this patent is extended or adjusted under 35 U.S.C. 154(b) by 95 days.

(21) Appl. No.: 15/449,989

(22) Filed: Mar. 5, 2017

(65) Prior Publication Data

US 2018/0253451 A1    Sep. 6, 2018

(51) Int. Cl.
| | | |
|---|---|---|
| *H04L 29/08* | (2006.01) | |
| *G06F 16/21* | (2019.01) | |
| *H04L 9/32* | (2006.01) | |
| *H04L 9/30* | (2006.01) | |
| *H04L 9/14* | (2006.01) | |
| *G06F 16/27* | (2019.01) | |
| *H04L 29/06* | (2006.01) | |

(52) U.S. Cl.
CPC ............ *G06F 16/211* (2019.01); *G06F 16/27* (2019.01); *H04L 9/14* (2013.01); *H04L 9/30* (2013.01); *H04L 9/3239* (2013.01); *H04L 9/3247* (2013.01); *H04L 63/123* (2013.01); *H04L 67/10* (2013.01); *H04L 67/42* (2013.01); *H04L 2209/38* (2013.01)

(58) Field of Classification Search
CPC ......... G06F 17/30292; G06F 17/30283; G06F 17/30575; G06F 16/211; G06F 16/27; H04L 67/10; H04L 9/14; H04L 9/3247; H04L 9/30; H04L 67/42; H04L 9/3239; H04L 63/123; H04L 2209/38
See application file for complete search history.

(56) References Cited

U.S. PATENT DOCUMENTS

| | | | |
|---|---|---|---|
| 7,505,993 | B2 | 3/2009 | Chan et al. |
| 2010/0146003 | A1 | 6/2010 | Bruso |
| 2016/0283920 | A1 | 9/2016 | Fisher |
| 2016/0371509 | A1 | 12/2016 | Unitt |

(Continued)

FOREIGN PATENT DOCUMENTS

GB    WO2017006135    1/2017

*Primary Examiner* — Meng Li

(57) ABSTRACT

A method and system is presented for reaching consensus on adding data to and extending the structure or schema of databases synchronized across a distributed ledger or blockchain system, in which no central trusted authority is available, comprising sending an announcement message by a network connected device to a plurality of network connected devices over a network, said message proposing a database schema change or extension. If the announcement message and preceding data in the distributed ledger satisfy predetermined conditions, the plurality of network connected devices may include the data in the distributed ledger, and modify the schema of their databases in a corresponding manner. If data is submitted that requires a structural change to the database before the announcement message has been incorporated in the distributed ledger, the data is rejected by the network and is not included in the distributed ledger.

12 Claims, 9 Drawing Sheets

(56) References Cited

U.S. PATENT DOCUMENTS

2017/0214522 A1\* 7/2017 Code .................... H04L 9/3247
2018/0039667 A1\* 2/2018 Pierce ................ G06Q 20/0658
2018/0096163 A1\* 4/2018 Jacques de Kadt .. G06F 21/602

\* cited by examiner

SYSTEM AND METHOD FOR ENFORCING THE STRUCTURE AND CONTENT OF DATABASES SYNCHRONIZED OVER A DISTRIBUTED LEDGER

TECHNICAL FIELD

This disclosure relates to computer systems and methods concerned with an addition of data to a plurality of databases synchronized through a distributed ledger or blockchain, henceforth referred to as the distributed ledger, and more specifically to an enforcement of a consensus amongst a plurality of participants as to how a schema for the plurality of databases will be maintained and/or extended via a medium of a network of the plurality of participants communicating through the distributed ledger.

BACKGROUND

Distributed ledgers provided in, for example, a peer-to-peer network, such as the distributed ledger used in the Bitcoin cryptocurrency system, rely on a consensus system agreed upon by participants on the peer-to-peer network in order to add blocks of data to the distributed ledger. In such systems, participants examine proposed data blocks in order to verify that they conform to a network agreed standard, rather than relying on a third-party trusted central authority to authorize the addition of data.

However, it may be impractical to use a file, in a flat-file format, which comprises data of the distributed ledger, in order to access the data contained therein efficiently. As a result, those skilled in the art know to implement a database system to extract the data from the distributed ledger and insert it into said database system, to facilitate searches for specific data entries.

Although the file, which constitutes a chain of data comprising the distributed ledger, may have a predetermined set of rules for ensuring blocks are added to the file representing the distributed ledger in a manner accepted by participants on the peer-to-peer network, nevertheless some of a data of interest encapsulated within a block may take many different unspecified or unpredictable formats.

It is currently the case that consensus systems used in distributed ledgers specify a format that an encapsulating data must take, that is: how a block links to a previous block within the chain, what format digital signatures within the block should comply with, and how hashes of the data of interest should be ordered and structured. However, the format of the data of interest encapsulated within the block are generally either unrestricted, or restricted at a launch of the distributed ledger and subsequently unalterable.

As a result there is a problem, in that a structure of tables within the database used to extract the distributed ledger data, and a permitted contents of such tables, are not well-defined.

It is therefore the intention of the present disclosure to address the problem of ensuring that a transaction or submission containing the data of interest submitted to the peer-to-peer network for inclusion in the distributed ledger has a format and structure that is agreed upon by participants on the peer-to-peer network, in order to ensure that the corresponding structure and contents of the plurality of databases are consistent, that is to say, that a consistent schema for the plurality of databases is defined and updated through the distributed ledger under a consensus of the peer-to-peer network.

SUMMARY

In accordance with the present disclosure, a solution is provided for reaching a consensus among network connected devices on a peer-to-peer network maintaining and extending a distributed ledger, as to what data to add to the distributed ledger over time, and in particular what format a data representing a database schema and table structure of a plurality of databases, constructed and synchronized from contents of the distributed ledger, should take.

Distributed ledger data validators, comprising, in a preferred embodiment of the present disclosure, a plurality of network connected devices participating in maintaining and extending the distributed ledger, may receive data and messages over the peer-to-peer network, which they may package into data blocks for potential inclusion in the distributed ledger.

In an embodiment, the plurality of network connected devices, each comprising one or more processors, and storage media comprising computer instructions, said plurality of network connected devices being connectible via a peer-to peer network to each other, are arranged such that when computer instructions are executed on the one or more processors of a one or more of the plurality of network connected devices, operations are caused for reaching a consensus for adding a block of data that includes a proposal for an extension to or alteration of the database schema to a distributed ledger. An addition of the block of data to the distributed ledger may constitute an acceptance by the plurality of network connected devices of said proposal.

In an embodiment, operations may commence by a first of the plurality of network connected devices generating a database schema change request message comprising a proposed extension to or alteration of the database schema that may indicate the intent of said first of the plurality of network connected devices to alter or extend the database schema of the corresponding plurality of databases.

Subsequently, the first of the plurality of network connected devices may transmit the database schema change request message, through the use of the peer-to-peer network, to the plurality of network connected devices connected to the peer-to-peer network.

A one or more of the plurality of network connected devices may then proceed by inserting the database schema change request message into a block of data conforming with a distributed ledger data format accepted by the plurality of network connected devices maintaining and extending the distributed ledger, and may transmit the block of data, through the use of the peer-to-peer network, to the plurality of network connected devices.

If one or more of a plurality of predetermined criteria are met, the plurality of network connected devices may then append or insert the block of data to the distributed ledger.

In an embodiment, one or more of the plurality of network connected devices may then proceed by extracting the proposed extension to or alteration of the database schema from the database schema change request message contained in the block of data previously added to the distributed ledger and synchronized across the peer-to-peer network, and applying the proposed extension to or alteration of the database schema to each of the plurality of databases. In this embodiment, one or more of the plurality of network connected devices may have its own instance of a database. In other embodiments, multiple network connected devices may share one instance of the database.

In an embodiment, if one, more or all of the predetermined criteria are not met, the plurality of network connected devices may reject the block of data, whereby the block of data is not added to the distributed ledger.

In an embodiment, the database schema change request message may be digitally signed by the first of the plurality of network connected devices using a private key of a public/private key pair. The public key of the public/private key pair may be publicly associated with the first of the plurality of network connected devices.

We move now to a brief examination of some of the predetermined criteria that may include a consensus system for the plurality of network connected devices to determine if the block of data will be accepted and added to the distributed ledger.

In an embodiment, the database schema change request message may be deemed valid only if it is included in a first block of data of the distributed ledger. The first block of data is commonly known to those skilled in the art as a genesis block, and may be generated by an originator of the distributed ledger. Under this embodiment, the database schema would remain fixed for a full lifespan of the distributed ledger.

In an embodiment, the data block may only be added if a specified subset of the plurality of predetermined criteria are met. The specified subset may include one, some, or all of the plurality of predetermined criteria.

Determining whether the plurality of predetermined criteria are met may be based on a one or more of: a previous data contained within the distributed ledger, a data contained within the block of data, a data available from a public computer server, a data available from a private computer server, a relationship between a plurality of data fields of the database and a public key of a public/private key pair, a consensus between the plurality of network connected devices, an authorization by a specific network connected device operating on the peer-to-peer network.

In a preferred embodiment, a criterion from the one of the plurality of predetermined criteria may based on the previous data contained within the distributed ledger. In this embodiment, a validity of the criterion may be determined by the plurality of network connected devices using a one or more computations or transformations of the previous data.

In one embodiment the computation compare the value of a hash of some or all of the previous data to determine if it matches, exceeds or falls below a target value.

In another embodiment the computation may comprise determining a presence of and verifying a validity of a digitally signed authorization within the previous data for a public key of a public/private key pair. This public key may be associated with the first of the network connected devices.

In an embodiment, the computation may determine an absence of a prior database schema change request message within a given subset of the previous data, and either rejecting or accepting the block of data based thereon.

In a generalization of the embodiments of the disclosure expounded above, the addition of a general data may be subjected to the same scrutiny and restrictions as per the the database schema change request message, which is itself data content submitted to the distributed ledger.

Under this embodiment of the disclosure, a second of the plurality of network connected devices may commence by extracting a database schema from the distributed ledger.

Subsequently, the second of the plurality of network connected devices may construct a data addition or change request message comprising a proposed addition to or modification of data, complying with the database schema extracted from the distributed ledger.

The second of the plurality of network connected devices may then transmit the data addition or change request message to the peer-to-peer network.

Subsequently a third of the plurality of network connected devices may extract the proposed addition to or modification of data from the data addition or change request message, and may insert it into a block of data; and The third of the plurality of network connected devices may then submit the block of data to the peer-to-peer network for validation and subsequent insertion into the distributed ledger.

If a one, more, or all of a plurality of predetermined criteria agreed upon by a plurality of network connected devices operating on the peer-to-peer network are determined by the plurality of network connected devices maintaining and extending the distributed ledger on the peer-to-peer network to be met, the plurality of network connected devices may then insert the block of data into the distributed ledger.

Conversely, if one, more or all of the plurality of predetermined criteria are not met, the plurality of network connected devices may reject the block of data, which is therefore not added to the distributed ledger.

In an embodiment, the second of the plurality of network connected devices may digitally sign the data addition or change request message using a private key of a public/private key pair.

In an embodiment, the plurality of predetermined criteria utilized by the plurality of network connected devices may be include of one or more of: compliance with the database schema extracted from the distributed ledger, verification of an identity of a submitter of the data addition or change request, authorization by a specific node operating on the peer-peer network, a result of a computation based on a previous data contained within the distributed ledger, a result of a computation performed on a data contained within the block of data, a result of a computation performed on a data available from a public computer server, a result of a computation performed on a data available from a private computer server, a relationship between a plurality of data fields of the database and a public key of a public/private key pair, a consensus between the plurality of participating nodes operating on the peer-to-peer network.

Through these means, the plurality of network connected devices and corresponding databases may be maintained in a synchronized state, with data added to the databases conforming to the database schema stored within the distributed ledger. Furthermore, the database schema may be altered or extended as per a need of a one or more of a plurality of operators of the plurality of network connected devices, or as required by an extension of or alteration to a format of data to be stored in the plurality of databases.

Those skilled in the art will further appreciate the advantages and superior features found in this disclosure together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present disclosure. In the figures, like reference numerals designate corresponding parts throughout the different views.

DETAILED DESCRIPTION

Figure 1:
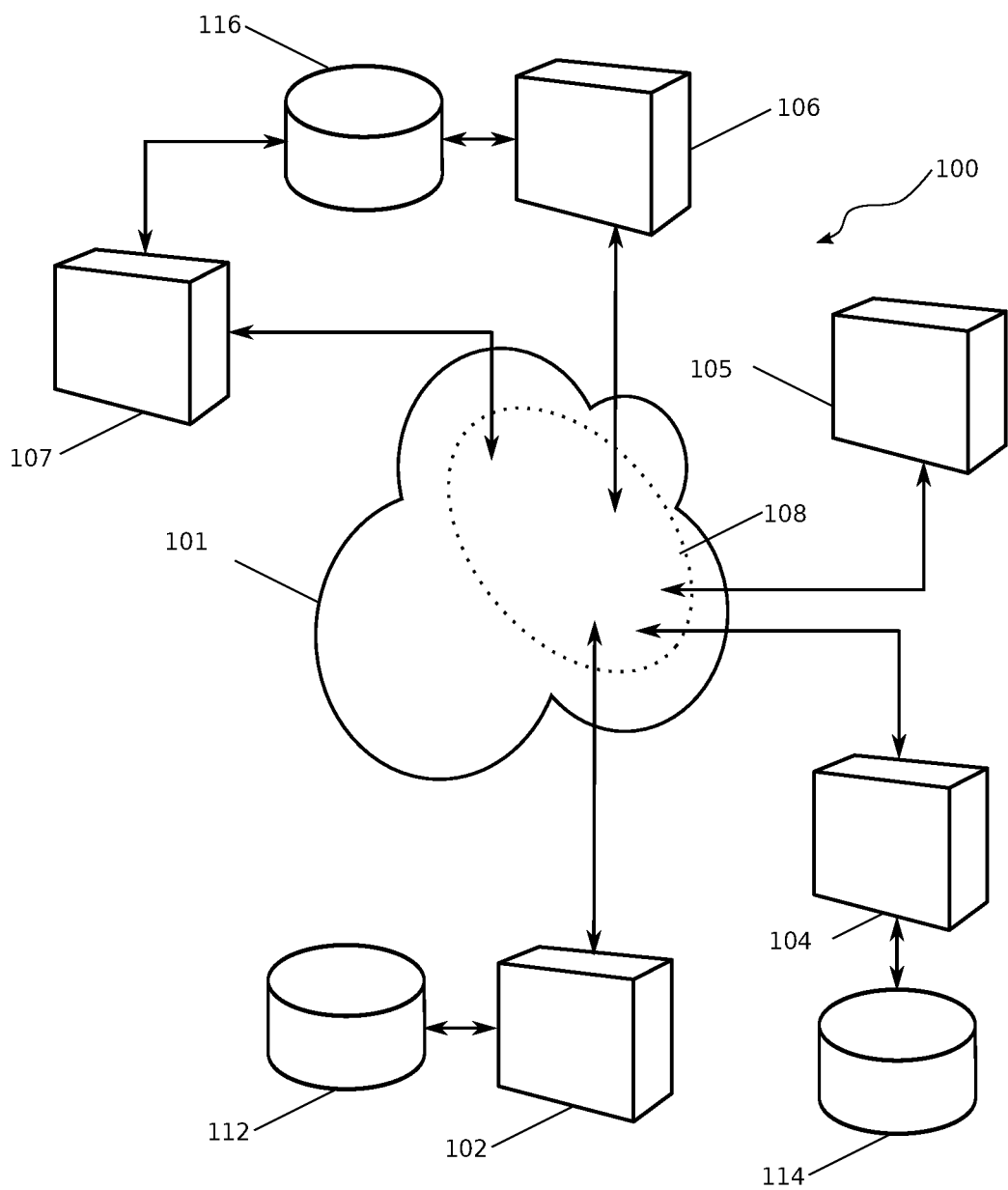
FIG. 1 illustrates a peer-to-peer network with a plurality of network connected devices connected to the peer-to-peer network, and a plurality of associated databases, in accordance with an embodiment of the present disclosure.

Aspects of this disclosure will be described in the context of an exemplary system of a plurality of network connected devices communicating through the medium of a peer-to-peer network system 100, thereby implementing a distributed ledger, as shown schematically in FIG. 1.

As depicted, a peer-to-peer network 108 is embodied within a packet switched network 101, through the interconnection of the plurality of network connected devices on the peer-to-peer network 108.

A network connected device 102 may connect to the peer-to-peer network through a direct connection to the packet switched network with a wired connection, or through a wireless connection by association with a wireless access point, a cellular base station, a Bluetooth connection, or other means of connection.

Other devices connected to the peer-to-peer network may include network connected devices acting as a communication node, for example network connected device 105 whose role is to maintain a list of other devices connected through the peer-to-peer network, and to forward on received network messages to those devices on the list, possibly independently, or possibly as a response to a request from another network connected device. As one skilled in the art will be aware, no individual communication node is required to have a complete list of all devices, as the process of peer-to-peer networking only requires that a union of a set of all communication nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the communication nodes on said network.

Further devices connected via the peer-to-peer network may include one or more network connected devices 104, 106, 107, each acting as a database synchronization node or a validator node, whose role may be to act as a communication node, and may also be to receive database schema change request messages and other transaction or data messages from the peer-to-peer network, process them according to the methods and processes to be described further below, and transmitting the results of said processing back to the peer-to-peer network for potential inclusion in the distributed ledger.

The devices described above may be implemented through a system comprising a one or a plurality of: a general purpose microprocessor, a digital signal processors (DSP), an application specific instruction set processor (ASIP), a field programmable gate array (FPGA), a dedicated application specific integrated chip (ASIC), or other equivalent integrated or discrete logic circuitry and peripheral circuitry, connected to a tangible storage medium containing instructions which when executed effect methods and techniques described below. The techniques additionally, or alternatively, may be realized at least in part by a computer-readable communication medium or record carrier, that carries or communicates code in the form of instructions or data structures and that can be accessed, read, and/or executed by a computer.

Returning to network connected device 102, said network connected device may be connected to a database 112, said database 112 either embodied within the network connected device 102 and communicated to through a network bus within the network connected device 102, or in an instantiation on a separate device or machine communicated to through an external packet-switched network connection, either on a local area network or wide area network, an external serial connection, through a wireless connection by association with a wireless access point, a cellular base station, a Bluetooth connection, or other means of connection.

Similarly, the network connected device 104 may be connected to a separate database 114 through any of the aforementioned connection systems.

Both network connected device 106 and network connected device 107 may be connected to a same database 116, each through any of the aforementioned connection systems, and may use any traditional synchronization methods as known to those skilled in the art of database synchronization for ensuring that records stored in the same database 116 may not be added or edited in a conflicting manner by either network connected device 106 or 107.

Figure 2:
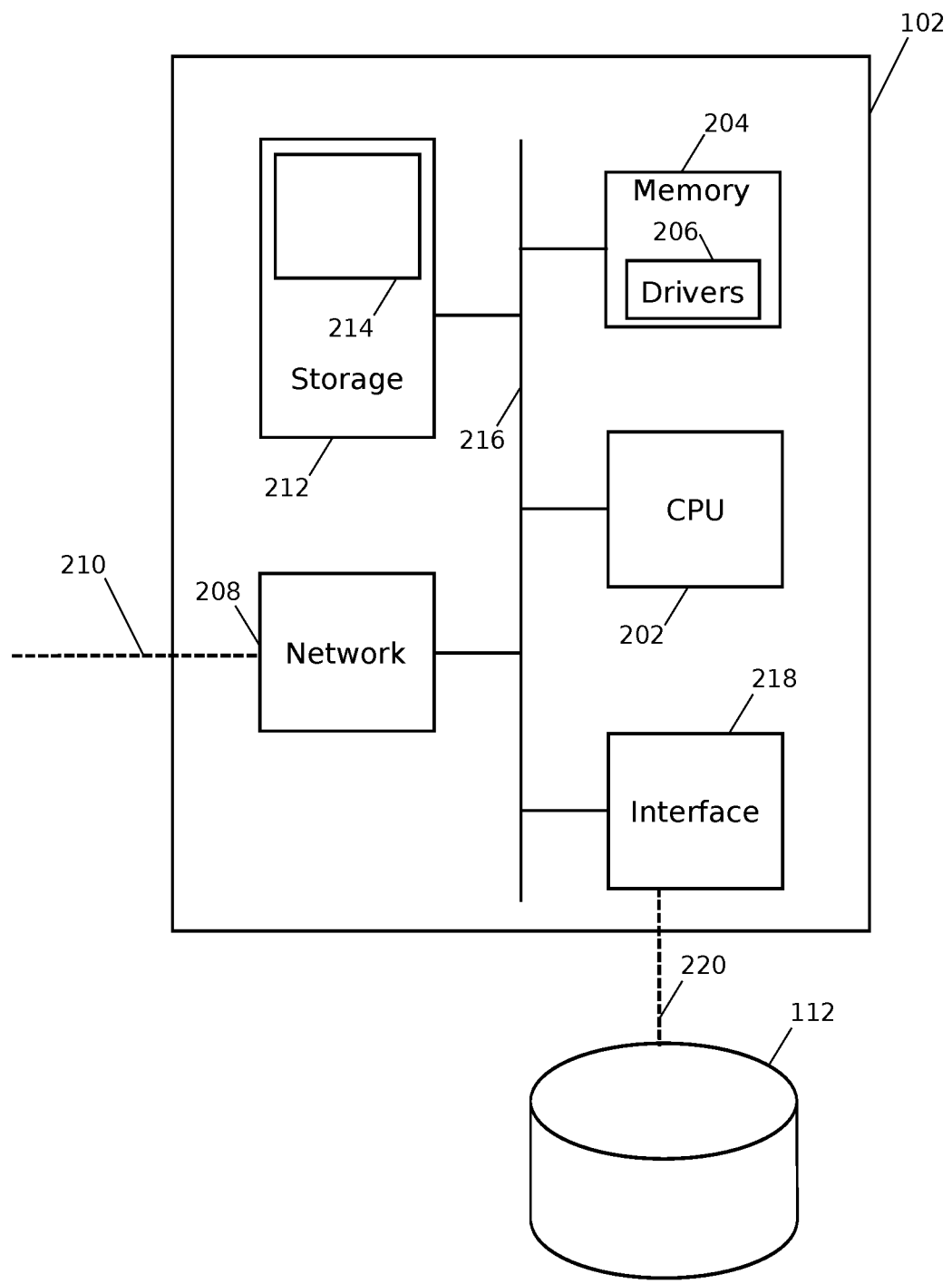
FIG. 2 illustrates a network connected device and associated database that may be utilized in the generation and submission of a database schema change request message, in accordance with an embodiment of the present disclosure.

An embodiment of the network connected device 102 is presented in FIG. 2, and is now discussed in further detail. The network connected device 102 may include a one or more central processing units (CPU) 202 capable of executing instructions stored in a memory 204, and controlling other peripheral components through drivers 206 stored within the memory 204.

Further storage 212 may be present, which may contain a cryptographically secure partition or component 214, where cryptographic keys may be securely stored.

The network connected device 102 may connect to the packet switched network through a network module 208, which may consist of a direct wired connection to the packet switched network through a cable 210. In a different embodiment, the network module 208 may contain wireless components comprising one or more wireless modules implemented in firmware or hardware, including a wireless local area network (WLAN) unit such as a Wi-Fi adapter utilizing an 802.11 protocol, a wireless wide area network (WWAN) unit such as Global System for Mobile communications (GSM), Long Term Evolution (LTE), or other cellular wireless data communication system, or a Bluetooth unit. The wireless components may provide network connectivity to a packet switched network and hence to the peer-to-peer network for the network connected device.

Components comprising the network connected device 102 may communicate through a bus 216, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

The network connected device 102 may, in some embodiments, include an interface 218 to permit communication with a database 112. In one possible embodiment, the database 112 may be external to the network connected device 102, and may be communicated with through a connecting cable 220. The connectivity may be implemented through an ethernet connection, a PCIe bus, a USB, a UART serial bus, a suitable AMBA interface, an SDIO bus, or other equivalent interface. In other embodiments, the database may be connected through a wireless connection, for example a WLAN unit such as a Wi-Fi adapter utilizing an 802.11 protocol, a WWAN unit such as GSM, LTE, or other cellular wireless data communication system, or a Bluetooth unit. In yet further embodiments of the system the database may be internal to the network connected device, and implemented entirely through software stored in storage 212 and/or memory 204, executed by the CPU 202, and communicating through the bus 216.

Figure 3:
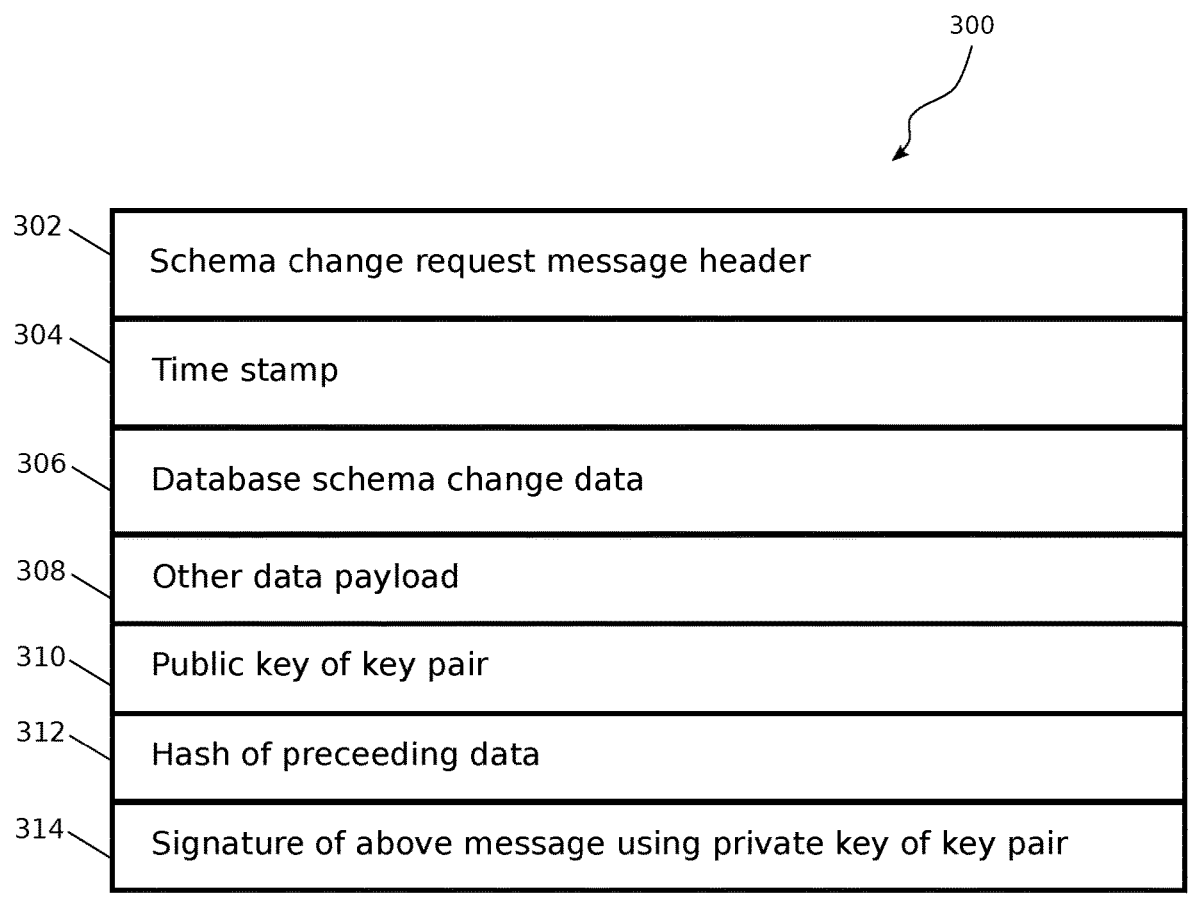
FIG. 3 is a block diagram illustrating a structure of a possible embodiment of a database schema change request message, in accordance with an embodiment of the present disclosure.

In an embodiment, the network connected device 102 may submit a database schema change request message 300 to the peer to peer network 108, a possible structure of which is described in FIG. 3.

The database schema change request message 300 may include a database schema change request message header. The database schema change request message header 302 may include a marker indicating that the rest of the message contains database schema change data, and other header information such as a length of the message and a version number of the message.

The database schema change request message 300 may include a time stamp 304, which in one embodiment may be used to indicate from what point in time the database schema change request message 300 is to be considered valid. Through these means it may be possible to register a database schema change request on the network with a future validity period, for example by specifying the time stamp as a future time. In another embodiment the time stamp may be a current time, thereby initiating authorizing the database schema change at the point the database schema change request message 300 is sent, or at a fixed predetermined time after the database schema change request message 300 is sent.

The database schema change request message 300 may include a database schema change data 306, which may describe the addition, alteration or deletion of a database schema. The database schema change data may be included in binary format, in JavaScript Object Notation (JSON), in Structured Query Language (SQL), in Extensible Markup Language (XML), or in another data format recognizable by a database as encoding a description of, extension to, alteration of or deletion of one or more of a plurality of structures, data tables, data descriptions and/or data format restrictions applicable to the database. Those skilled in the art will recognize that a database schema change description may include the initialization of a database structure as well as the alteration or addition to an existing database structure.

Those skilled in the art will be aware that a database contains a description of a structure of the database, known as a database schema, and which represents a logical view of the entire database. It may describe how data is organized and how the relationship between various elements of data is defined. The database schema may formulate all the constraints that are to be applied to the data.

The database schema may define entities that constitute the components of the database and the relationship between them, and may contain a detailed description of the database, which may be depicted by a schema diagram.

For example, the database schema may define a set of database tables, each containing a set of data fields, some of which may be restricted to only containing data in one of: a text format, a numerical formal, a numerical format restricted to integer values, a numerical format restricted to values less than or greater than a prescribed value, a discrete list of values that a given data value may be chosen from, a Boolean value, a specified length of a data field, a specified checksum that a data must satisfy, or some other data value or data structure.

The database schema change data 306 may include a description of how a given structure described by the database schema may be altered. For example, if the database schema restricts a length of a data field to a given number of characters, the database schema change data 306 may alter the restriction to increase or to decrease the length of the data field. Similarly, if the database schema restricts a data field to only contain numerical data, another element of the database schema change data 306 may alter this to allow text to be contained in data stored under the data field. In a further example, the database schema may restrict a data field to contain Elliptic Curve Digital Signature Algorithm (ECDSA) key data, and the database schema change data 306 may alter this to restrict the data field to contain ElGamal key data. In general the database schema change data 306 may contain data pertaining to instructions to alter any restriction on any data field as defined by the current database schema to any other restriction, or even the absence of a restriction, thus changing the underlying database schema.

In another example, the database schema may link a one data table to another data table. For example, a first data table may contain a list of options, and a second data table may contain data including a field whose value is to be selected from the list of options provided in the first data table. The database schema change data 306 may, in this example, contain an instruction to allow the field in the second data table to also contain a value selected from a differing table containing a differing list of options.

In another example, the database schema may be non-existent, and the database schema change data 306 may contain a set of instructions that define a complete initial database schema, thus initializing the database system.

The database schema change request message 300 may include another data payload 308, which may include but is not limited to: at least one row of data to be inserted into a database, an information or meta-data relating to the submitter of the database schema change request message 300, a cryptocurrency transaction, an encoding of an executable computer program or smart contract, another distributed ledger transaction.

The database schema change request message 300 may include a public key 310 of a public/private key pair generated by the network connected device 102 submitting the database schema change request message. The public key infrastructure or algorithm may be one of ECDSA, digital signature algorithm (DSA), Rivest, Shamir, & Adleman (RSA), ElGamal, or some other secure asymmetric cryptographic key system.

The database schema change request message 300 may also include a hash 312 of a data contained in a preceding message content. The data to be hashed may include one or more of the public key of the public/private key pair 310, the other data payload 308, the database schema change data 306, the time stamp 304 and/or the database schema change request message header 302. The hash may be one of a secure hash algorithm (SHA), RACE integrity primitives evaluation message digest (RIPEMD), Whirlpool, Scrypt, HAS-160, BLAKE, or other cryptographic hash function applied to the preceding content of the message.

The database schema change request message 300 may also include a digital signature 314, generated using a private key of the public/private key pair associated with the public key 310 and the hash 312 of the data contained in the preceding message content, in order to provide for a veracity or an authentication of database schema change request message 300. The digital signature algorithm used may be one of ECDSA, DSA, RSA, ElGamal, or some other secure asymmetric key digital signing algorithm.

In an embodiment, an authorization, for example a second digital signature, may be appended to or inserted into the database schema change request message 300, and may include a hash of some or all of the preceding message, and the digital signature 314, generated using a second private key of a second public/private key pair, for example a public key of an agency or a device providing permission to insert a database schema change request message into the distributed ledger. In this embodiment, the authorization may be added at a later stage by one other of the plurality of network connected devices.

Figure 4:
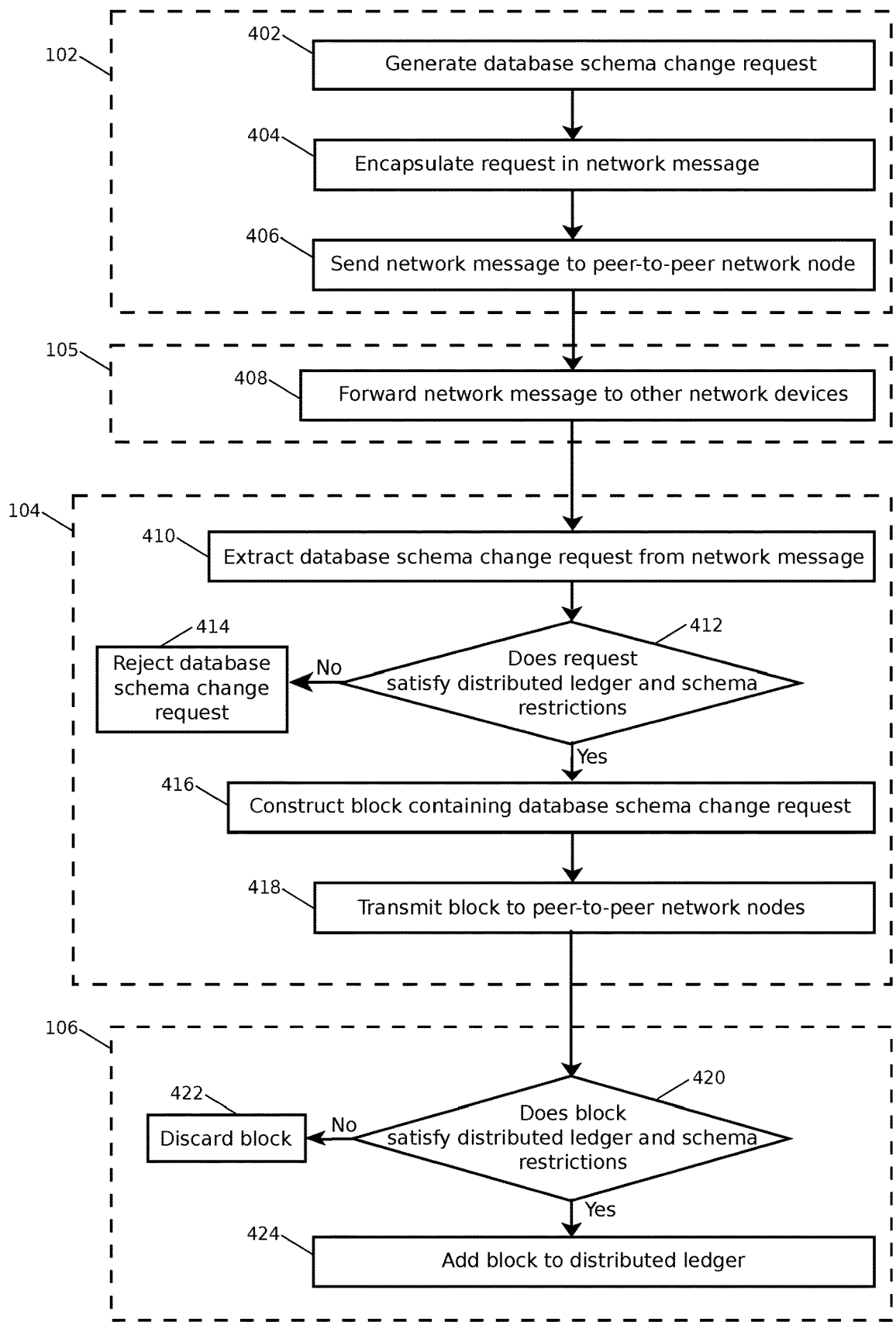
FIG. 4 is a signal flow diagram providing a general overview of a method and apparatus controlling the flow of the database schema change request message data from the first of the plurality of network connected devices to the plurality of network connected devices connected via the peer-to-peer network for eventual inclusion in the distributed ledger.

A high level flow diagram illustrating one possible embodiment of the system and steps taken therein is presented in FIG. 4. Note that although the embodiment and example provided by FIG. 4 is for a generation and inclusion of a single database schema change request message in the distributed ledger, the same flow diagram and associated methods and processes apply to the generation and inclusion of multiple database schema change request messages.

A set of multiple database schema change request messages may differ from a single database schema change request message in that different database schema change requests from different network connected devices may be packaged into one block of data by a network connected device functioning as a validator node 104 for submission to the peer-to-peer network and possible inclusion in the distributed ledger. This allows for more efficient processing of multiple database schema change request messages submitted at approximately the same time by, for example, reducing a data overhead induced by a requirement for header data and digital signature data included in the block of data.

From here on "a database schema change request message" can therefore be equally read as "multiple database schema change request messages".

Note further that an other data not necessarily concerned with database schemas may also be generated and included in a data block and inserted or appended to the distributed ledger following the same methods taught in the following paragraphs describing the function and implementation of the system and method illustrated by FIG. 4. This other data may include further data for inclusion in fields or rows of the database, digital key announcement or revocation messages, cryptographic currency or native asset transaction messages, or other general data that may be of interest to participants on the peer-to-peer network.

The interaction of the network connected device 102 with the plurality of network connected devices, and specifically a network connected device functioning as a communication node 105, and the network connected device functioning as the validator node 104, and finally another one of the plurality of network connected devices 106 functioning as a further validator node, is shown. The flow of a data comprising the generation of the database schema change request message, inclusion in a successfully generated block of data, and an insertion or appending of said block of data to the distributed ledger is also illustrated through FIG. 4.

The successfully generated block of data may conform to a definition of acceptable data blocks, as defined through a consensus protocol accepted by the plurality of network connected devices participating on the peer-to-peer network, which may comprise a set of rules and structural requirements for such acceptable data blocks. A generated block of data may be considered successful if it is conformant with the definition of acceptable data blocks and is accepted by, for example, a majority, a predetermined number or percentage, or a specific subset, of the plurality of network connected devices.

A block of data may comprise a binary block, a character-based string, or a data structure which may itself comprise a collection of keys, values, and other substructures of data. The function of generating blocks of data may be the encapsulation of data to produce candidates for consideration by the plurality of network in order to be included in the distributed ledger. It is through this that the distributed ledger may grow in size over time, storing data of interest in the process.

Once the network connected device 102 has determined a need to add, modify or extend the database schema of the database associated with the distributed ledger, it may generate a database schema change request 402. The database schema change request may then be encapsulated in a network message 404 and sent on to the peer-to-peer network 406.

The database schema change request may contain information on how a structure of and rules applying to the database associated with the distributed ledger and contents of said database may be changed in order to accommodate changing requirements for data storage in the database as time progresses. An advantage of this aspect of the disclosure is that distributed ledgers possess features such as auditable and tamper-proof data storage that traditional databases do not, and by maintaining and altering the database schema on the distributed ledger, the advantages of these features apply to the database itself.

The database schema change request may be generated by including a complete revision of the database schema in the database schema change request, or by including a list of changes, additions and deletions, known to those skilled in the art as "deltas", to the database schema.

Once the database schema change request encapsulated in the network message has been received by a network connected device acting as a communication node 105, the communication node 105 may forward the message to other network connected devices on the peer-to-peer network as per step 408. Other network connected devices may also make requests to the communication node 105 for network messages that they have not yet received. Through this, the database schema change request encapsulated in the network message is forwarded to all interested parties on the peer-to-peer network.

Through these network interactions, the database schema change request encapsulated in the network message may arrive at a network connected device acting as a validator node 104.

The validator node 104 may then extract the database schema change request from the network message as per step 410.

The validator node 104 may then inspect the database schema change request, as per step 412, to determine if it satisfies a consensus protocol of the distributed ledger. Said consensus protocol may include: compliance with authorization protocols, compliance with database schema design restrictions, compliance with database data restrictions, presence of a valid digital signature, or other distributed ledger and database schema restrictions.

The consensus protocol may comprise a set of rules, data structures and other computational requirements that a data submitted to the distributed ledger may be required to comply with in order for the data to be accepted in to the distributed ledger. The rules may include requirements that data may not exceed a given length, that it is digitally signed by a submitter of the data, that it is time stamped, and so on. The computational requirements may include requirements that the data contains short programs or scripts which, when executed on any one of the plurality of network connected devices return a predetermined result or value, for example a value of "true", a number of a predetermined magnitude, a number exceeding or falling below a predetermined value, a public key, or some other result.

The consensus protocol may be stored in memory within the plurality of network connected devices, and may comprise instructions that are retrieved and executed by a processors within the plurality of network connected devices.

The consensus protocol may also comprise data that may be retrieved by each of the plurality of network connected devices from their respective memories or data storage units, and may be compared with data received over the network to determine if the rules, data structure requirements or computational requirements have been met.

If the validator node 104 determines that the database schema change request does not comply with the consensus protocol of the distributed ledger, the validator node 104 may proceed to step 414, and may discard the database schema request.

If the validator node 104 determines that the database schema change request does comply with the consensus protocol of the distributed ledger, and optionally if the database schema change request has not been included in a prior block of data, the validator node 104 may proceed to step 416.

In step 416 the validator node 104 may proceed by constructing a block of data comprising the database schema change request and any other messages that the validator node 104 has previously received and that have not yet been included in the distributed ledger. The block of data may be constructed in a manner that satisfies the consensus protocol of the distributed ledger, as is known to those skilled in the art. The block of data may also contain other messages and elements, for example but not limited to, other database schema change requests, financial transaction data, key announcement and/or key revocation data, and other data to be stored in the distributed ledger.

The validator node 104 may then transmit the block of data containing the database schema change request to the peer-to-peer network as per step 418.

Through transmission to the peer-to-peer network, the block of data may arrive at an another network connected device 106, which may constitute a further validator node. As marked by step 420, the other network connected device 106 may then repeat the same computation as previously performed by the previous validator node 104 in step 412, and the computation may return either a successful result (Yes) or a failure (No).

If the computation result of step 420 is a failure (No), the other network connected device 106 may determine the block of data generated by the validator node 104 to not be compliant with the consensus protocol of the distributed ledger, and may discard the block, as shown in step 422.

If the computation in step 420 produces a successful result, then the other network connected device 106 may determine the block of data generated by the validator node 104 to be compliant with the consensus protocol of the distributed ledger, and may add the block of data to its copy of the distributed ledger, as indicated by step 424.

Figure 5:
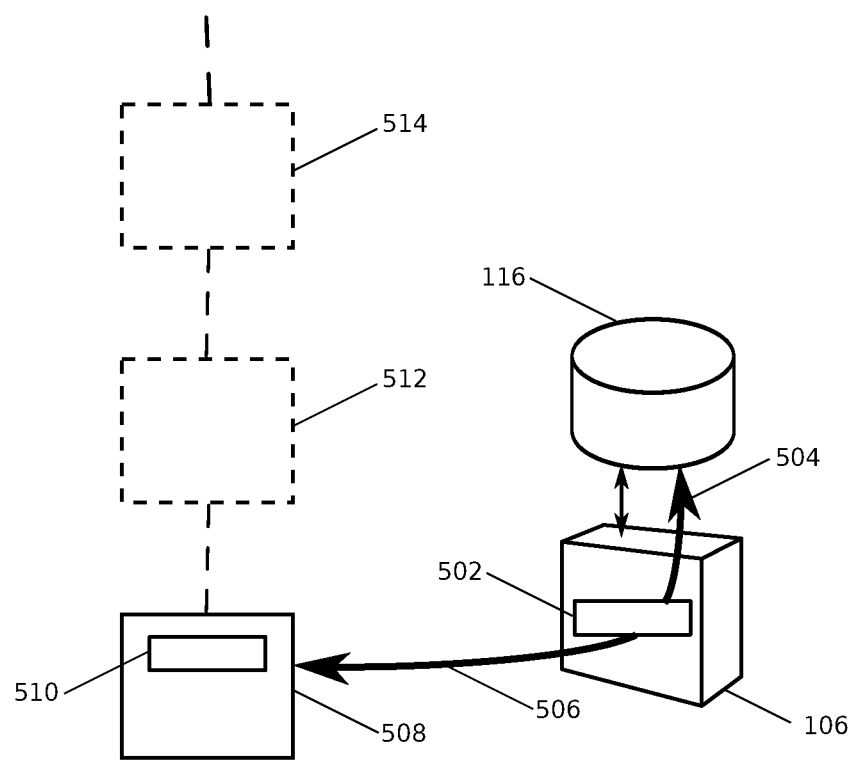
FIG. 5 is a diagram presenting a commencement or genesis of a distributed ledger by a network connected device with an associated database, and includes the addition of an initial database schema in a first block of the distributed ledger.

In FIG. 5. a system and apparatus for generating an initial block of a distributed ledger, also known by those skilled in the art as a genesis block, is illustrated. In this embodiment, the network connected device 106 with the associated database 116 may initiate the creation and running of the distributed ledger by executing the steps below.

The network connected device 106 may produce a database schema 502, which may include a description of tables, data field links, restrictions and other database schema components.

The network connected device 106 may apply the database schema 502 to the data in the associated database 116, as indicated by a transfer arrow 504.

The network connected device 106 may also generate a genesis block 508, comprising a database schema change request 510 containing the database schema 502. The network connected device 106 may then transmit the genesis block onward to a peer-to-peer network as indicated by transfer arrow 506 for other network connected devices to receive and utilize as a starting block for the distributed ledger.

The network connected device 106, and other network connected devices may then participate in generating and adding further distributed ledger blocks 512, 514 and so on, to the distributed ledger.

Figure 6:
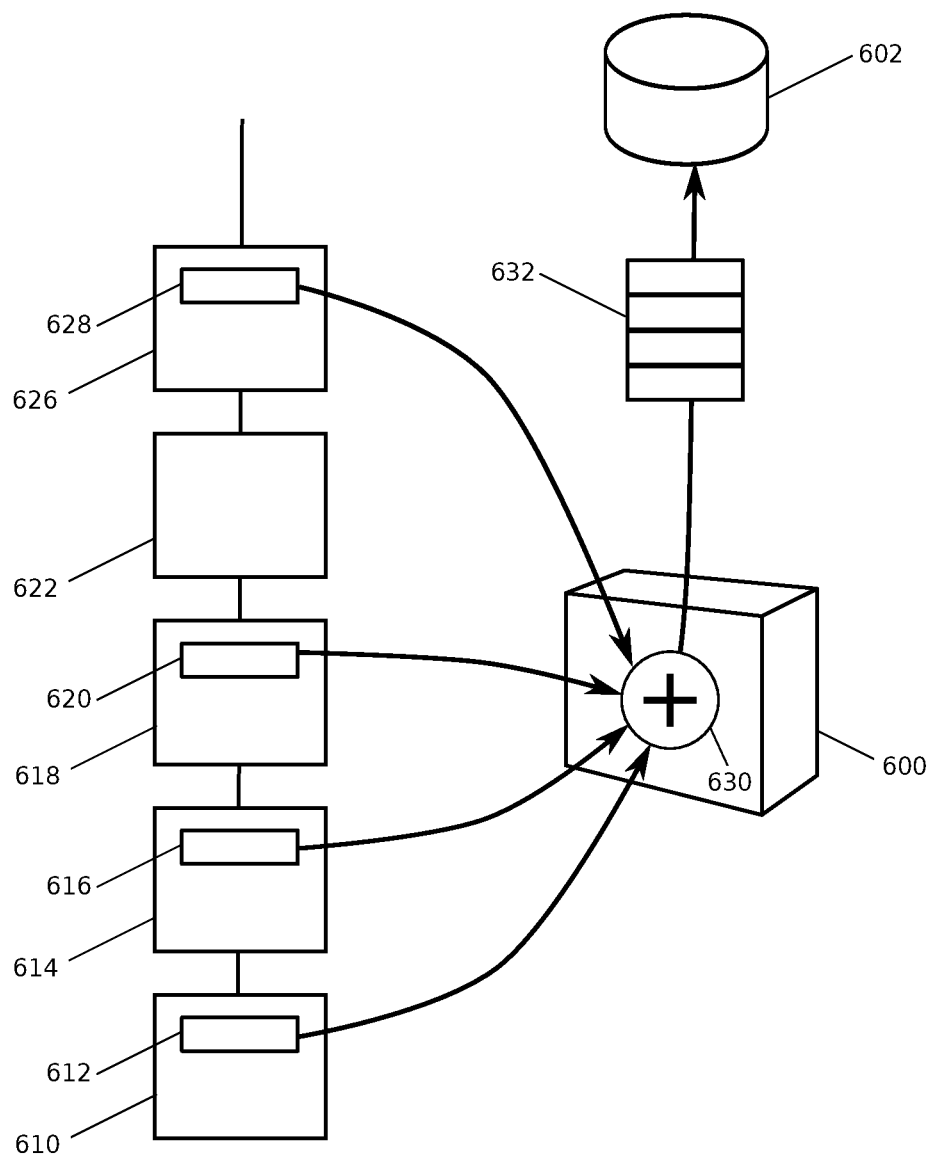
FIG. 6 is a diagram illustrating a new network connected device joining the distributed ledger, extracting database schema change requests, and constructing a complete database schema to apply to an associated database.

In FIG. 6 a new network connected device 600 may join the distributed ledger and may commence downloading distributed ledger blocks of data over the peer-to-peer network, starting with a genesis block 610, and in this example without loss of generality followed by other blocks 614, 618, 622 and 626 in sequence. In other embodiments of the disclosure the other blocks of data may be received out of order and reassembled into the proper order once received.

For each block downloaded, the new network connected device 600 may inspect a block content to determine if it contains a database schema change request, and may extract and store any database schema change request discovered, thus generating a set of database schema change requests. In this example a block 610 contains a database schema change request 612, a block 614 contains a database schema change request 616, a block 618 contains a database schema change request 620, and a block 626 contains a database schema change request 628. A block 622 contains no database schema change request.

The set of database schema requests may then be combined, as illustrated by an operation 630. A later database schema change request may, in some embodiments, take precedence over an earlier database schema change request.

The result of operation 630 may then result in a complete combined database schema 632, which may represent a current state of a database schema embodied in the distributed ledger, and may be enforced by the new network connected device 600 on an associated database 602.

As has been demonstrated, through the methods and systems illustrated in FIG. 6 and the descriptive paragraphs above concerning it, information may be obtained from the distributed ledger by the new network connected device 600 to ensure a consistent database schema is applied to the associated database 602.

Figure 7:
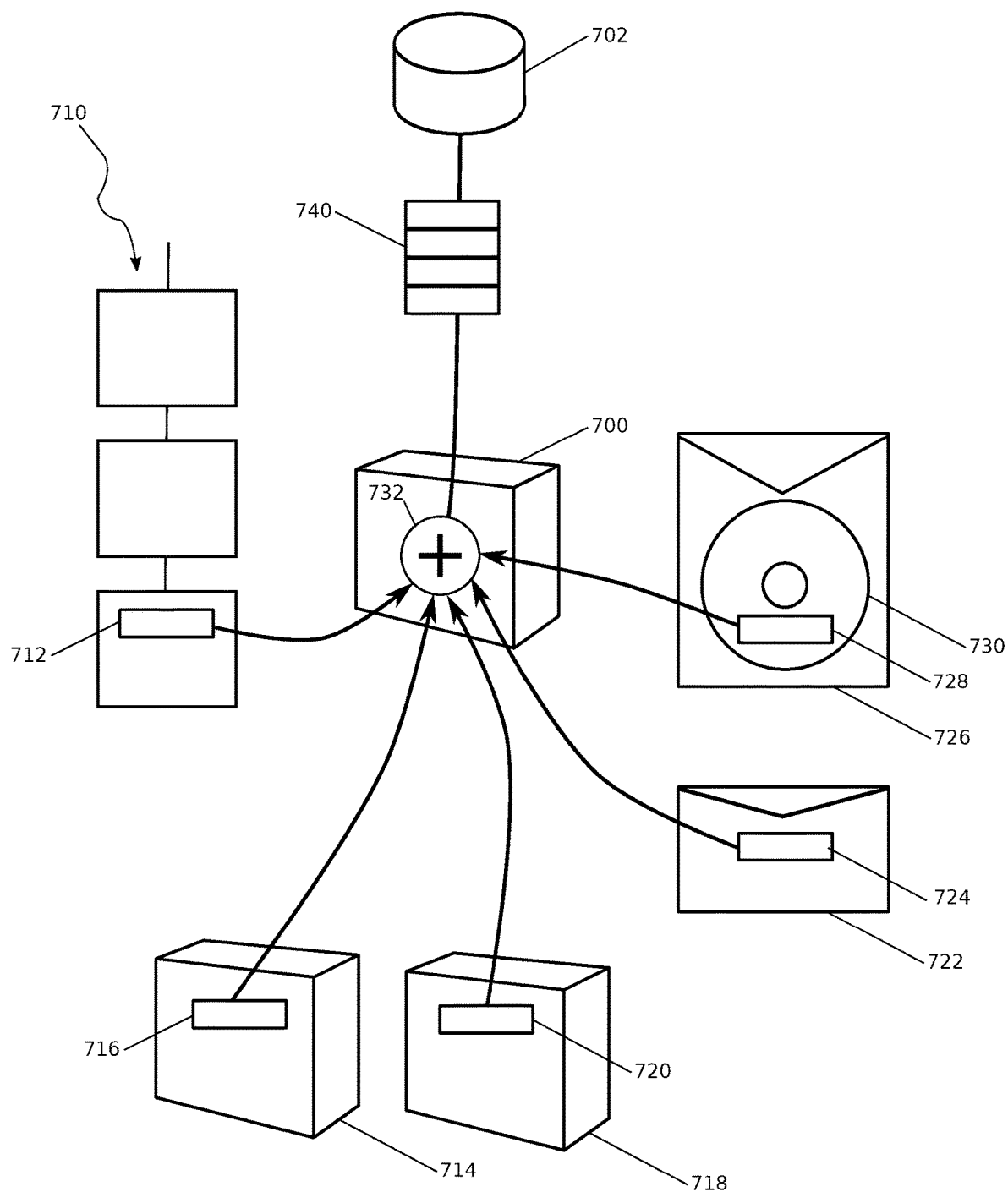
FIG. 7 is a diagram illustrating a new network connected device constructing a complete database scheme from a plurality of data sources.

In FIG. 7, in an embodiment of the invention, a further network connected device 700 may browse the distributed ledger 710 and may commence obtaining data from one or more data sources in order to construct, through a combinatoric function 732 or some other constructive and/or additive and/or iterative function, the database schema 740 for the database 702 associated with the distributed ledger 710.

The further network connected device 700 may download data 712, representing all or part of the database schema, from a data source comprising the distributed ledger 710.

The further network connected device 700 may download data 716, representing all or part of the database schema, over the network through a file or data transfer protocol, from a data source comprising a public computer server 714.

The further network connected device 700 may download data 720, representing all or part of the database schema, over the network through a file or data transfer protocol, from a data source comprising a private computer server 718.

The further network connected device 700 may obtain data 724, representing all or part of the database schema, through an email 722 sent over a public or private network.

The data 724 may be contained in the email using, for example but not limited to: a Multipurpose Internet Mail Extension (MIME) type, a text representation within a body of the email, a binary attachment, a binary-to-text encoding.

The further network connected device 700 may obtain data 728, representing all or part of the database schema, contained within a removable data medium delivered through another distribution channel.

By way of example, and not limitation, the distribution channel in FIG. 7 may be through postal mail 726, however any suitable physical distribution for delivering the removable data medium may suffice, for example through a courier, a physical handover or other transfer.

By way of example, and not limitation, the removable data medium in FIG. 7 is represented by a Compact Disc-Read Only Memory (CD-ROM) 730 placed within an envelope and delivered through postal mail, however any such removable data medium can comprise a power-backed RAM chip, a ROM chip, an EEPROM chip, a non-volatile RAM chip (NVRAM), other optical disc storage, magnetic disk storage or other magnetic storage devices, or any other medium that can be used to carry or store desired data in a permanent or semi-permanent manner and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above may also be included within the scope of removable data media.

Figure 8:
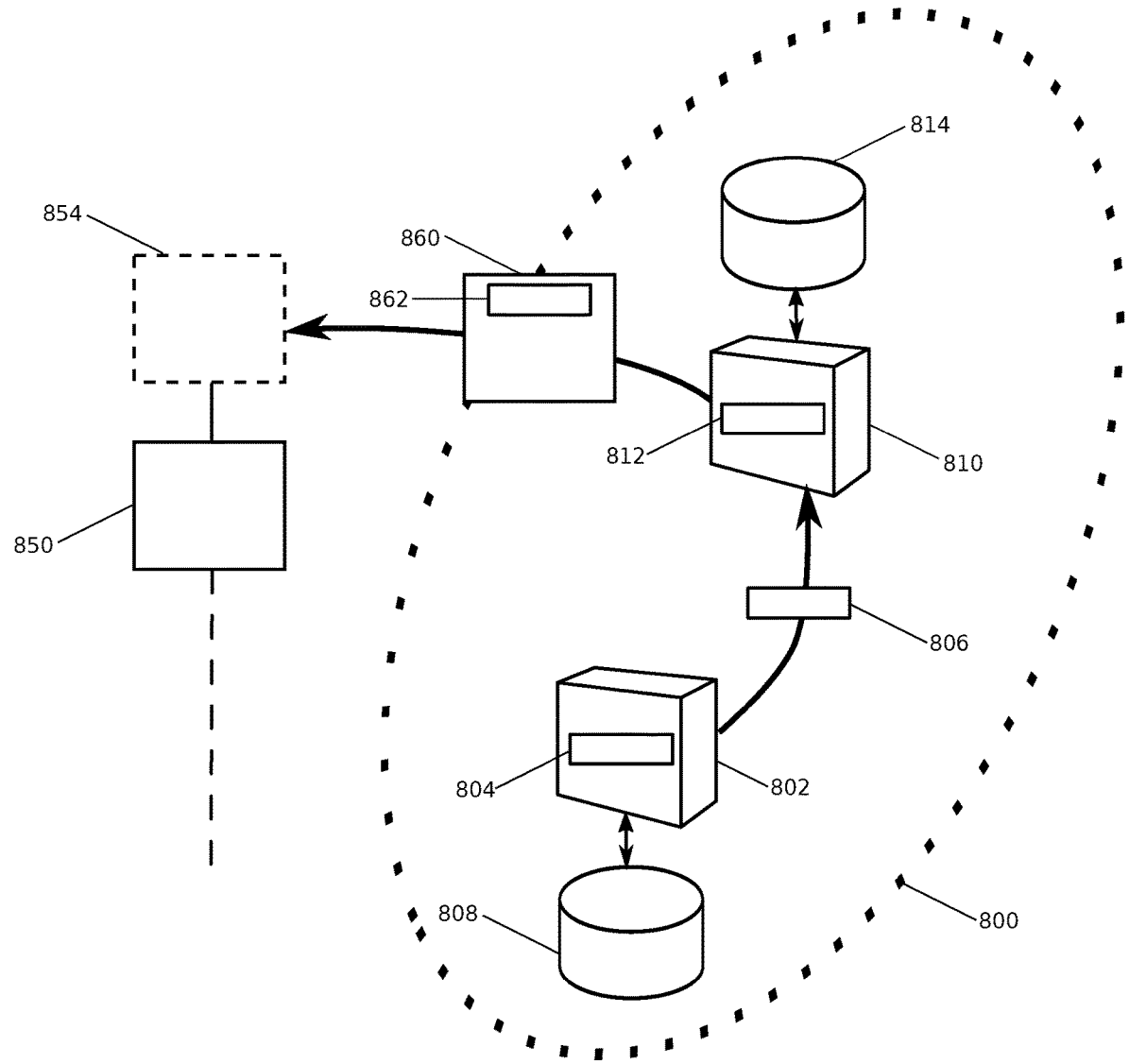
FIG. 8 is a diagram illustrating a network connected device submitting a database change request message to the peer-to-peer network, and a second network connected device on the peer-to-peer network encapsulating the database change request message in a data block and appending it to the distributed ledger.

In FIG. 8 a database schema 804 is altered, reduced or extended to a new form 806, transmitted to the peer-to-peer network 800, accepted by a one of the plurality network connected devices 810 maintaining and extending the distributed ledger, and encapsulated into a data block 860, which is subsequently appended to the distributed ledger as a new block 854.

We now examine FIG. 8 in more detail. A network connected device 802 may reach a state in which it requires an extension to, a reduction of, or an alteration of a database schema 804 extracted from the distributed ledger that is applied to an associated database 808.

For example, a current database schema may restrict the length of a field used for storing customer names to a fixed number of characters, but it may be necessary to add a new customer with a name longer than that fixed number to the database, requiring a change to the current database schema to allow longer entries in the field.

In another example, the current database schema may provide details for a table used to store addresses, and the table may not contain a column for storing the country of the addresses. It may be necessary to add an address in a country different from all previous addresses, requiring a change to the current database schema to add an extra column for storing an address country.

The current state of the art either restricts a structure for data stored in the distributed ledger to a fixed format that cannot be subsequently changed, or allows any format of data to be stored in the distributed ledger. An advantage of this disclosure is that it describes how a distributed ledger may be initiated with a restricted structure for data to be stored in the distributed ledger, but how that structure may subsequently be altered as the need arises.

In FIG. 8 the network connected device 802 may generate a database schema change request 806 that embodies the required extension to, reduction of or alteration of the database schema, as disclosed above.

In one embodiment of the disclosure, a human operator of the system may decide that the database schema should be changed, and may trigger a generation of the database schema change request 806 through, for example, a user interface, by selecting a new representation of a state of the database schema.

In another embodiment of the disclosure, a sensor enabled device may trigger the generation of the database schema change request 806 through, for example, a generation and submission of sensor data in a new format to the plurality of network connected devices, and a one of the plurality of network connected devices may in response generate the database schema change request 806 to accommodate the new format.

In another embodiment of the disclosure, an automatically generated value may trigger the generation of the database schema change request 806, for example a counter may roll over to a larger size, requiring a larger data field to accommodate a new larger counter value. The submission of the counter in a larger format to the plurality of network connected devices may then cause a one of the plurality of network connected devices to generate the database schema change request 806 in response in order to accommodate the new larger value.

The network connected device 802 may then transmit the database schema change request 806 to the peer-to-peer network 800.

The one of the plurality of network connected devices 810, which may store a database schema 812 that includes a copy of the database schema 804, as both were previously extracted from the distributed ledger, and may be applying the database schema 812 to an associated database 814, may receive the database schema change request 806 and examine it.

The one of the plurality of network connected devices 810 may then determine that the database schema change request complies with the consensus protocol accepted by the plurality of network connected devices participating in maintaining and extending the distributed ledger, and may therefore insert a copy of the database schema change request, said copy denoted by 862, into a block candidate 860 for a next addition to the distributed ledger.

If the plurality of network connected devices on the peer-to-peer network 800 accept the block candidate 860, it may then be appended to a head block 850 of the distributed ledger, taking a position indicated by 854.

We proceed now to examine how the plurality of network connected devices may determine if a block candidate and encapsulated database schema change request may satisfy a set of distributed ledger and schema restrictions. This determination is described as a consensus protocol. An embodiment of this disclosure may utilize one, some or all of the aspects of the consensus protocols described below, or other aspects of consensus protocols commonly known to those skilled in the art.

In an embodiment, the consensus protocol may allow database schema change requests to be submitted by any participant on the distributed ledger, and the plurality of network connected devices may accept any such database schema change.

At the other end of the spectrum, the consensus protocol many limit database schema change requests to at least an initial database schema specified in a first block of the distributed ledger.

In another embodiment, the consensus protocol may include the acceptance of database schema change requests only if submitted by an authorized network connected device, and in some embodiments if digitally signed by said authorized network connected device.

In another embodiment, the consensus protocol may include only accepting a database schema change request if no prior database schema change request has been submitted within: a predetermined number of blocks, a predetermined time, an other condition.

In another embodiment, the consensus protocol may depend on a retrieved data from a public computer server or a private computer server, or a combination of both, and performing a calculation on or a comparison between the retrieved data and the database schema change request to determine if the database schema change request may be included in the distributed ledger. The retrieved data may, for example, include a published schema specification.

Figure 9:
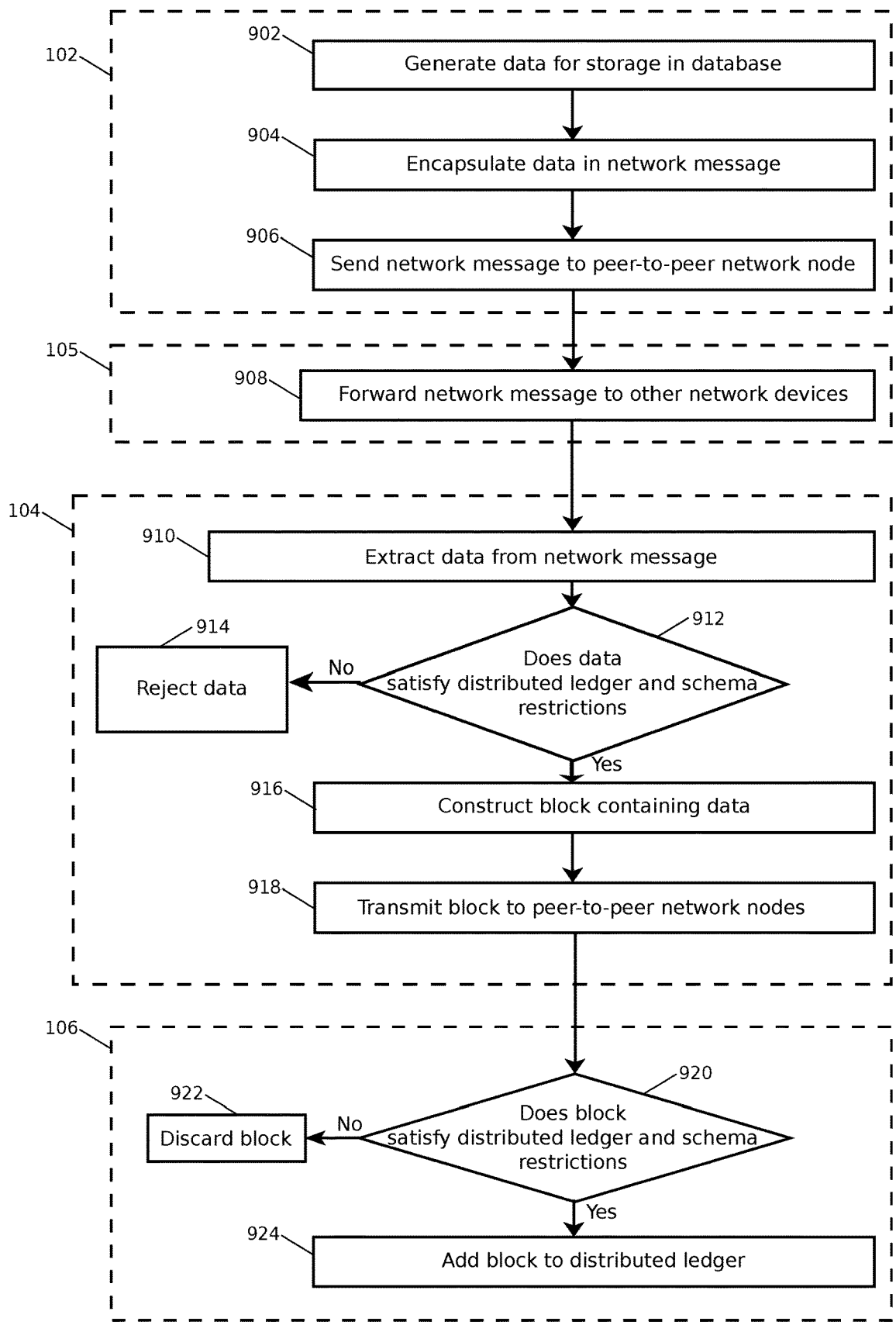
FIG. 9 is a signal flow diagram providing a general overview of a method and apparatus controlling the flow of a data message from the first of the plurality network connected device to the plurality of network connected devices connected via the peer-to-peer network for eventual inclusion in the distributed ledger.

A high level flow diagram illustrating data submitted to the distributed ledger and validated against the database schema represented in the distributed ledger is presented in FIG. 9. Note that although the embodiment and example provided by FIG. 9 is for a generation and inclusion of a single data message in the distributed ledger, the same flow diagram and associated methods and processes apply to the generation and inclusion of multiple data messages. From here on "a data message" can be equally read as "multiple data messages".

The interaction of the network connected device 102 with the plurality of network connected devices, and specifically a network connected device functioning as a communication node 105, and a network connected device functioning as a validator node 104, and finally another one of the plurality of network connected devices 106 functioning as a further validator node, is shown. The flow of a data comprising the generation of the data message, inclusion in a successfully generated block of data, and an insertion or appending of said block of data to the distributed ledger is also illustrated through FIG. 9.

Once the network connected device 102 has determined a need to add data to the distributed ledger, it may generate a data message 902. The data message may then be encapsulated in a network message 904 and sent on to the peer-to-peer network 906.

Once the data message encapsulated in the network message has been received by a network connected device acting as a communication node 105, the communication node 105 may forward the message to other network connected devices on the peer-to-peer network as per step 908. Other network connected devices may also make requests to the communication node 105 for network messages that they have not yet received. Through these means, the database schema change request encapsulated in the network message is forwarded to all interested parties on the peer-to-peer network.

Through these network interactions, the data message encapsulated in the network message may arrive at a network connected device acting as a validator node 104.

The validator node 104 may then extract the data message from the network message as per step 910.

The validator node 104 may then inspect the data message, as per step 912, to determine if it satisfies the consensus protocol of the distributed ledger. Said consensus protocol may include: compliance with authorization protocols, compliance with database schema design restrictions, compliance with database data restrictions, presence of a valid digital signature, or other distributed ledger and database schema restrictions.

If the validator node 104 determines that the data message does not comply with the consensus protocol of the distributed ledger the validator node 104 may proceed to step 914, and may discard the data message.

If the validator node 104 determines that the data message does comply with the consensus protocol of the distributed ledger, and optionally if the data message has not been included in a prior block of data, the validator node 104 may proceed to step 916.

In step 916 the validator node 104 may proceed by constructing a block of data comprising the database message and any other messages that the validator node 104 has previously received and that have not yet been included in the distributed ledger. The block of data may be constructed in a manner that satisfies the consensus protocol of the distributed ledger, as is known to those skilled in the art. The block of data may also contain other messages and elements, for example but not limited to, other data messages, financial transaction data, key announcement and/or key revocation data, and other data to be stored in the distributed ledger.

The validator node 104 may then transmit the block of data containing the data message to the peer-to-peer network as per step 918.

Through transmission to the peer-to-peer network, the block of data may arrive at an another network connected device 106, which may constitute a further validator node. As marked by step 920, the another network connected device 106 may then repeat the same computation as previously performed by the validator node 104 in step 912, and the computation may return either a successful result (Yes) or a failure (No).

If the computation result of step 920 is a failure (No), the another network connected device 106 may determine the block of data generated by the validator node 104 to not be compliant with the consensus protocol of the distributed ledger, and may discard the block, as shown in step 922.

If the computation in step 920 produces a successful result, then the another network connected device 106 may determine the block of data generated by the validator node 104 to be compliant with the consensus protocol of the distributed ledger, and may add the block of data to its copy of the distributed ledger, as indicated by step 924.

Through these means the data message generated in step 902 may be included in the distributed ledger, provided it complies with the database schema of the distributed ledger.

The technology described herein is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic-link library.

The system may be used in connection with various operating systems such as Linux®, UNIX® or Microsoft Windows®.

The system may be written in any conventional programming language such as C, C++, Pascal, or Java, and ran under a conventional operating system. C, C++, Pascal, Java, and FORTRAN are industry standard programming languages for which many commercial compilers can be used to create executable code. The system may also be written using interpreted languages such as Perl, Python or Ruby, or languages that may either be compiled or interpreted, such as BASIC or Lisp.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

As will be appreciated from the above discussion, an advantage of the systems and methods of this disclosure includes reaching a consensus among peers participating in a construction, maintenance and extension of a database structure and associated restrictions for a data format, namely a database schema, that is applicable to a distributed ledger, a distributed immutable shared file, a distributed ledger, or a shared peer-to-peer database, in a deterministic and objective manner.

What is claimed is:

1. A method for modifying a schema for a database maintained using a distributed ledger on a network comprising:
   generating a schema change request comprising a proposed modification of the schema;
   digitally signing the schema change request using a private key of a public/private key pair;
   transmitting the schema change request to the network;
   inserting the schema change request into a data block;
   submitting the data block to the network;
   adding the data block to the distributed ledger when one or more predetermined criteria agreed upon by a plurality of participating nodes operating on the network are met;
   extracting the schema change request from the distributed ledger;
   applying the proposed modification of the schema to the database;
and wherein the one or more predetermined criteria are based on a previous data contained within the distributed ledger, said one or more predetermined criteria comprising at least one of:
   confirming a presence of a digitally signed authorization within the previous data for the public key of the public/private key pair, and
   confirming an absence of a digitally signed revocation within the previous data for the public key of the public/private key pair.

2. The method of claim 1, wherein some or all of the schema for the database is distributed through distribution channels comprising one or more of:
   the distributed ledger,
   a private computer server,
   a public computer server,
   a file distributed through email,
   a file distributed on a removable data medium delivered through another distribution channel.

3. The method of claim 2, wherein the data block is not added to the distributed ledger when the one or more predetermined criteria are not met.

4. The method of claim 3, wherein the one or more predetermined criteria are not met when the schema change request is not included in a first data block of the distributed ledger.

5. The method of claim 1, wherein determining that some or all of the one or more predetermined criteria are met is further based on one or more of:
- a result of a computation performed on a previous data contained within the distributed ledger,
- a result of a computation performed on data contained within the data block,
- a result of a computation performed on data available from a public computer server,
- a result of a computation performed on data available from a private computer server,
- a relationship between a data field of the database and a public key of a public/private key pair,
- a consensus between the plurality of participating nodes operating on the network, and/or
- an authorization by a specific node operating on the network.

6. The method of claim 5, wherein when a criterion of the one or more predetermined criteria is based on the previous data, a validity of the criterion is determined using one or more of:
- a hash of some or all of the previous data, and/or
- an absence of a prior schema change request within a given subset of the previous data.

7. A plurality of network connected devices, each comprising: one or more processors, and storage media comprising computer instructions, said plurality of network connected devices being connectable via a network to each other, arranged such that when computer instructions are executed on the one or more processors of one or more of the plurality of network connected devices, operations are caused for reaching a consensus among the plurality of network connected devices for modifying a schema for a plurality of databases maintained by the plurality of network connected devices using a distributed ledger on a network comprising:
- generating, by a first of the plurality of network connected devices, a schema change request comprising a proposed moderation of the schema;
- digitally signing the schema change request, by the first of the plurality of network connected devices, using a private key of a public/private key pair;
- transmitting the schema change request, by the first of the plurality of network connected devices, through the network, to the plurality of network connected devices;
- inserting the schema change request into a data block by a second of the plurality of network connected devices;
- transmitting the data block, by the second of the plurality of network connected devices, to the network;
- adding the data block to the distributed ledger, by the plurality of network connected devices, when one or more predetermined criteria are met;
- extracting the proposed modification of the schema from the schema change request contained in the data block, by the plurality of network connected devices; and
- applying the proposed modification of the schema to the plurality of databases, by the plurality of network connected devices;

and wherein the one or more predetermined criteria are based on a previous data contained within the distributed ledger, said one or more predetermined criteria comprising at least one of:
- confirming a presence of a digitally signed authorization within the previous data for the public key of the public/private key pair, and
- confirming an absence of a digitally signed revocation within the previous data for the public key of the public/private key pair.

8. The plurality of network connected devices of claim 7, wherein some or all of the schema for the plurality of databases is distributed to the plurality of network connected devices through distribution channels comprising one or more of:
- the distributed ledger,
- a private computer server,
- a public computer server,
- a file distributed through email,
- a file distributed on a removable data medium delivered through another distribution channel.

9. The plurality of network connected devices of claim 8, wherein the data block is not added to the distributed ledger by the plurality of network connected devices when the one or more predetermined criteria are not met.

10. The plurality of network connected devices of claim 8, wherein the one or more predetermined criteria are determined not to be met, by the plurality of network connected devices, when the schema change request is not included in a first data block of the distributed ledger.

11. The plurality of network connected devices of claim 7, wherein determining by the plurality of network connected devices that the one or more predetermined criteria are met is further based on a one or more of:
- a result of a computation performed on previous data contained within the distributed ledger,
- a result of a computation performed on data contained within the data block,
- a result of a computation performed on data available from a public computer server,
- a result of a computation performed on data available from a private computer server,
- a relationship between a data field of the plurality of databases and a public key of a public/private key pair,
- a consensus between the plurality of network connected devices, and/or
- an authorization by a specific network connected device operating on the network.

12. The plurality of network connected devices of claim 11, wherein when a criterion from the one or more predetermined criteria is based on the previous data contained within the distributed ledger, a validity of the criterion is determined by the plurality of network connected devices using one or more of:
- a hash of some or all of the previous data,
- an absence of a prior schema change request within a given subset of the previous data.

* * * * *